J. B. BARCALO.

2 Sheets—Sheet 1.

Grain Separator.

No. 1,519.

Reissued Aug. 11, 1863.

WITNESSES

A Ferross

C H Cherry

INVENTOR

J B Barcalo

By J Fraser & Co.

Attys

N. PETERS, Photo-Lithographer, Washington, D. C.

2 Sheets—Sheet 2.

J. B. BARCALO.

Grain Separator.

No. 1,519.

Reissued Aug. 11, 1863.

WITNESSES

D. Farrss

C. H. Cherry

INVENTOR

J. B. Barcalo,

By J. Fraser & Co.

Attys

N. PETERS, Photo-Lithographer, Washington, D. C.

UNITED STATES PATENT OFFICE.

JOEL B. BARCALO, OF TUSCARORA, NEW YORK.

IMPROVEMENT IN GRAIN-SEPARATORS.

Specification forming part of Letters Patent No. 37,082, dated December 9, 1862; Reissue No. 1,519, dated August 11, 1863.

*To all whom it may concern:*

Be it known that I, J. B. BARCALO, of Tuscarora, in the county of Livingston and State of New York, did invent certain new and useful Improvements in Grain-Separators, for which Letters Patent of the United States were granted to me on the 9th of December, 1862; and I do hereby declare that the following is a full and exact description thereof, reference being had to the accompanying drawings, making part of this specification.

Figure 1:
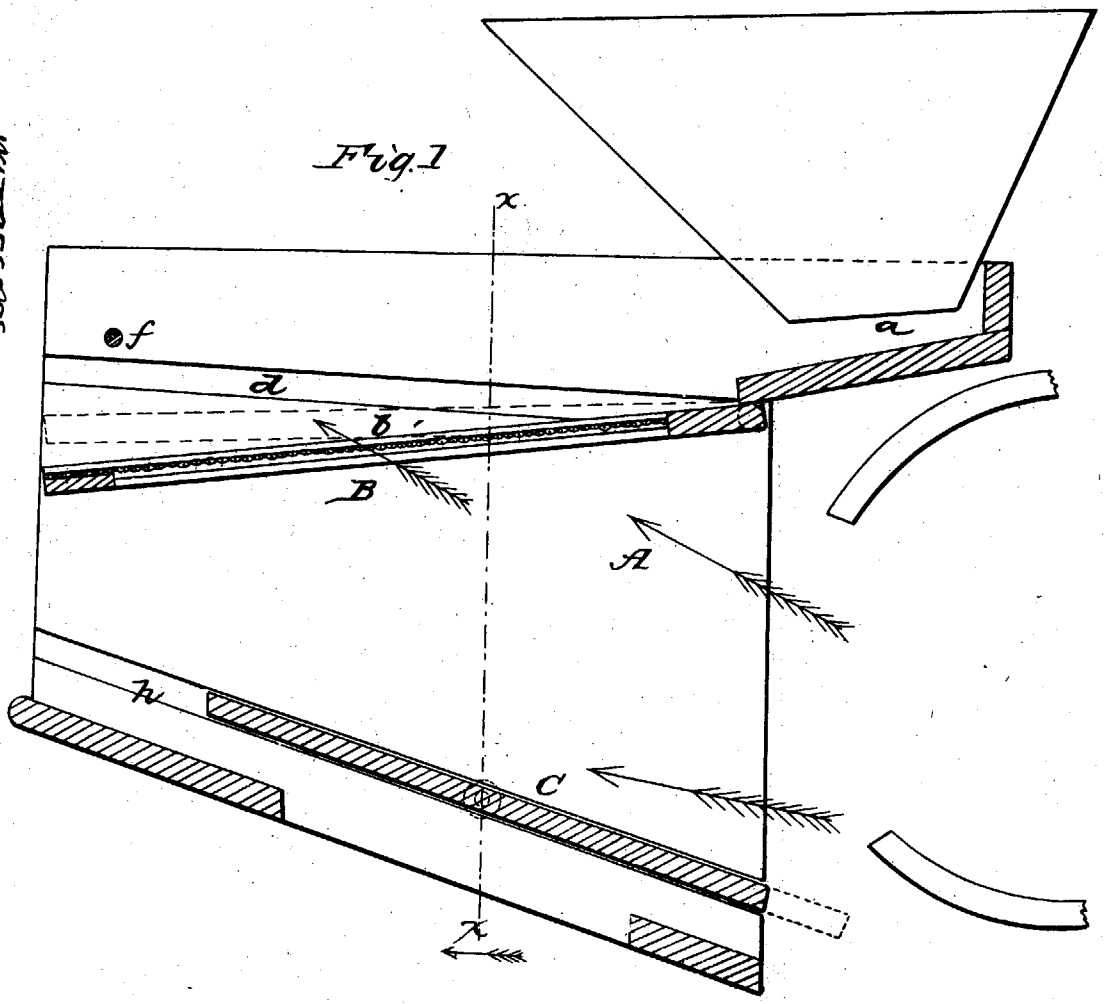
Figure 2:
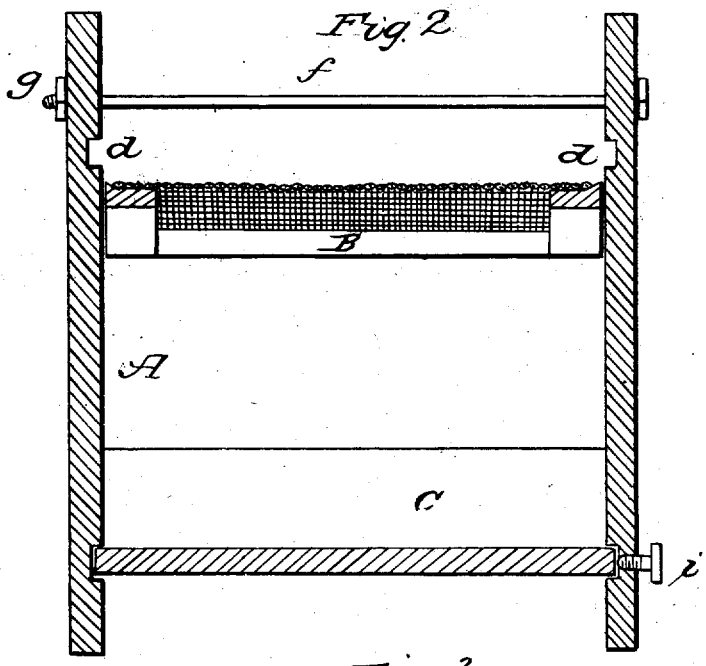
Figure 3:
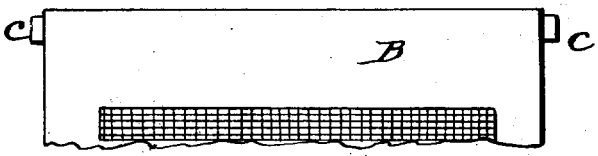

Figure 1 is a central longitudinal vertical section of the shoe of a grain-separator provided with my improvements; Fig. 2, a transverse vertical section of the same in the plane of line *x x*, Fig. 1; Fig. 3, a plan of the upper end of the screen.

Like letters of reference indicate corresponding parts in all the figures.

My invention consists in the use of a single open-mesh screen, whose upper end turns on an axis and is non-adjustable, but whose lower or discharge end is adjustable vertically, and also in the employment of a longitudinally-sliding discharge-board beneath the screen, that can be adjusted to the exact point of separation between the good and bad seed, catching and discharging the former, but avoiding the latter, as hereinafter described.

As represented in the drawings, an ordinary shoe, A, is employed, having an inclined bed or chute, *a*, that receives the grain from the hopper above and conducts it to the screen. The screen B in general construction is the same as that ordinarily used, consisting of a frame covered by open wire meshes, *b*. In its arrangement and operation, however, it is somewhat peculiar. At the upper or induction end it is provided on opposite sides, respectively, with small bearings or journals *c c*, which rest in the opposite sides of the shoe, being inserted in gains *d d*. The opposite or discharge end of the screen is made adjustable vertically, sliding freely between the sides of the shoe, and secured at any position by any suitable means, that represented in the drawings being a rod, *f*, extending from side to side of the shoe, provided with a head on one end, and having a nut, *g*, screwing on the other. When this is screwed up, it clamps the two sides of the shoe against the screen and holds the whole firmly in place. When unscrewed it allows the screen to move. This clamping device is very effective and convenient. By this peculiar arrangement of the screen relatively to the shoe I am enabled to apply it to any ordinary fanning-mill, the bearings *c c* sliding in the gains by their projection, while the body of the screen has a free action to adjust. This is an advantage not found in ordinary devices, which require a particular adaptation of the shoe and screen.

In the preparation of seed-wheat especially it is very necessary that the grain should be thoroughly separated from all foreign grains and seeds, as well as all impurities. This I accomplish at one action so perfectly that one screening is sufficient.

As different kinds of grain require different degrees of intensity of blast, and also a more or less acute angle of the same, I produce the desired result by adjusting the inclination of the screen. Thus, when the screen is lowered, as in black lines, Fig. 1, the blast acts more directly on the grain that passes over it, and when raised, as indicated by red lines, it acts less directly.

I am aware that a system of adjustable screens has before been employed, but there is a radical difference between such an arrangement and the single open-meshed adjustable screen I use, which difference I will endeavor to explain.

In the separation of the refuse from wheat it is essential that the blast should pass freely through the screen to buoy up the material as it passes along, and also that the screen should be entirely free and unimpeded from above, so that the mass will have a free action on the screen, and be constantly lightened or stirred by the current of air. This effect is accomplished perfectly in the single adjustable screen that I employ, its relative angle with the blast being such that the chaff is blown, as it were, nearly straight outward or directly from the sieve without traversing its whole length, while the oats, being heavier, pass along lightly and are discharged over the end, leaving the sound and heavy wheat to pass through the meshes alone.

In an arrangement of adjustable compound sieves a little consideration will show that this effect cannot be produced, and that really so perfect a separation of the grain cannot be attained as by a single screen arranged as above described. In the first place, it is impossible to make a system of screens adjustable and still retain the full benefit of the angular blast in all positions, for if adjusted low the blast will only pass directly through the meshes in an upward direction, and not in an effective manner in a longitudinal direction. To accomplis this last effect the position of the screens must at least approximate the direction of the blast, so that the latter will pass easily through from end to end. If the inclination is considerable, the current of air cannot pass through easily. In the next place, the mass of chaff and grain that passes down over the surface of the upper sieve does not receive the full strength of the blast, which must pass through the other sieves before reaching it. Consequently the chaff is not blown directly outward or off from the screen, as in my device, but must either traverse the whole length of the upper screen and fall over its end, or else pass through with the grain to the next sieve, and from that to the next, till it finally escapes at the discharge end. The collection of the material between the screens tends still further to obstruct the action of the blast on the upper screen, where it is so essential, and consequently the mass thereon passes down heavily and without being stirred or lightened, except by the agitation of the shoe. In a word, the action of the compound screen is to clean the grain more by sifting, while the blast is merely auxiliary, while my device is arranged with the especial purpose of blowing the chaff off and buoying the oats, so that they can escape while the heavy grain falls through, the screen proper merely acting to separate the products. This difference and advantage is obvious, as well as the necessity of a vertical adjustment to adapt the intensity or directness of the blast to the kind or condition of grain.

Practical experience has proved that my single adjustable screen is more effective in separating grain than any arrangement of compound sieves. In the passage of the mass over the screen of course some impurities or foreign seeds will escape through with the sound grain, especially toward the lower end of the screen. If no provision is made, the discharge-board C, or its equivalent, such as a screen beneath, will catch these impurities and conduct them downward with the wheat. To obviate any difficulty of this kind, I make this discharge-board adjustable longitudinally, so that its upper end can be moved to the exact point of separation of the pure and impure seed. A convenient means of adjustment is for the board to rest in gains *h h*, and for a set-screw, *i*, to pass through one side of the shoe for retaining the board at any position.

Such foreign matter as falls through the screen is generally lighter than the wheat, and if it falls on the upper end of the board the tendency of the blast is to blow it over the elevated end. Thus the separation of the grain may be made perfect, which is essential in seed-grains.

I do not claim, broadly, a vertically-adjusting screen, nor a longitudinally-adjusting discharge-board; but

What I claim as my invention, and desire to secure by Letters Patent, is—

1. The vertically-adjusting screen B, having projecting bearings *c c*, when arranged in combination with the shoe A′ and its gains *d d*, in such a manner that the screen can be applied to any ordinary mill without special adaptation, said screen being adjusted relatively to the blast by means of the rod and nut *f g*, or equivalent, the whole arranged and operating substantially as herein set forth.

2. In combination with the vertically-adjusting screen B, the longitudinally-adjusting discarge-board C, substantially as herein described.

In witness whereof I have hereunto signed my name in the presence of two subscribing witnesses.

JOEL B. BARCALO.

Witnesses:
T. J. GAMBLE,
MYRON J. BARCALO.